United States Patent [19]

Wahl

[11] Patent Number: 5,898,456
[45] Date of Patent: *Apr. 27, 1999

[54] COMMUNICATION SYSTEM WITH HIERARCHICAL SERVER STRUCTURE

[75] Inventor: Stefan Wahl, Schwieberdingen, Germany

[73] Assignee: Alcatel N.V., Rijswijk, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/634,761

[22] Filed: Apr. 19, 1996

[30] Foreign Application Priority Data

Apr. 25, 1995 [DE] Germany ............................ 195 14 616

[51] Int. Cl.⁶ .............................. H04N 7/10; H04N 7/14; H04H 1/00
[52] U.S. Cl. ...................................... 348/7; 348/8; 348/13; 348/16; 348/17; 455/4.2; 455/453
[58] Field of Search ................................ 348/6, 7, 8, 10, 348/12, 13, 16, 17; 455/3.1, 4.1, 4.2, 453, 552, 553, 560, 561, 436, 439; H04N 7/10, 7/14; H04H 1/00

[56] References Cited

U.S. PATENT DOCUMENTS

| | | | |
|---|---|---|---|
| 4,670,899 | 6/1987 | Brody et al. ............................... | 455/33 |
| 4,949,187 | 8/1990 | Cohen . | |
| 5,172,413 | 12/1992 | Bradley et al. ............................. | 348/7 |
| 5,293,641 | 3/1994 | Kallin et al. .............................. | 455/453 |
| 5,341,216 | 8/1994 | Hoffart ..................................... | 455/4.2 |
| 5,528,282 | 6/1996 | Voeten et al. .............................. | 348/7 |
| 5,550,577 | 8/1996 | Verbiest et al. ............................ | 348/7 |
| 5,553,005 | 9/1996 | Voeten et al. .............................. | 364/514 |
| 5,583,994 | 12/1996 | Rangan ..................................... | 348/7 |
| 5,592,470 | 1/1997 | Rudrapatna et al. ....................... | 348/7 |
| 5,592,626 | 1/1997 | Papadimitriou et al. ................... | 348/7 |
| 5,603,058 | 2/1997 | Belknap et al. ........................... | 395/855 |
| 5,749,055 | 5/1998 | Dahlin ..................................... | 455/453 |

FOREIGN PATENT DOCUMENTS

| | | |
|---|---|---|
| 0450610 | 10/1991 | European Pat. Off. . |
| 0611047 | 8/1994 | European Pat. Off. . |
| 0625856 | 11/1994 | European Pat. Off. . |
| 4330031 | 9/1994 | Germany . |

OTHER PUBLICATIONS

"An Open–Systems Approach to Video on Demand", Y. Chang et al, *IEEE Communications Magazine*, May 1994, pp. 68–80.

"PC–qestutzter Arbeitsplatz fur die ACD–Gruppenaufsicht", S. Appel et al, *Philips Innovation*, Jan. 1991, pp. 58–64.

"A Store–And–Forward Architecture for Video–On–Demand Service" by A.D. Gelman, et al, Communications: Rising to the Heights Jun. 23–26, 1991, Conference Record, vol. 2 of 3, pp. 842–846.

*Primary Examiner*—Bryan Tung
*Assistant Examiner*—Nhon T. Diep
*Attorney, Agent, or Firm*—Ware, Fressola, Van Der Sluys & Adolphson LLP

[57] ABSTRACT

A communication system (KS) with a hierarchical server structure is indicated for a demand service, which makes possible a suitable compliance with requests for services from users (U1 . . . UN). To that end, the communication system (KS), as viewed by the respective user (U1 . . . UN), is divided into a central (I) and a local (II) distance zone. Movies (A1 . . . A10) frequently requested by the users (U1 . . . UN) are stored in local servers (SL1 . . . SLN) and seldom requested movies (B1 . . . B100) are stored in central servers (SM). According to the invention, in case the local server (SL1) is unable to provide a movie (B2) requested by a user (U11 . . . U13), the central server SM or another local server (SL2 . . . SLN) complies with the request through a switched connection between the requesting user (U11 . . . U13) and the central server (SM), or the other local server (SL2 . . . SLN).

14 Claims, 5 Drawing Sheets

|   TAB M    |        |                |
| ---------- | ------ | -------------- |
| FILM       | SERVER | FAW            |
| B2         | SL1    | FAW$_{B2}$     |
| .          | .      | .              |
| .          | .      | .              |

|   TABL1    |        |                |
| ---------- | ------ | -------------- |
| FILM       | SERVER | FAW            |
| A1         | SL1    | FAW$_{A1}$     |
| A10        | SL1    | FAW$_{A10}$    |
| .          | .      | .              |
| .          | .      | .              |

| TAB M | | |
|---|---|---|
| FILM | SERVER | FAW |
| A10 | SL1 | $FAW_{A10}$ |
| ... | ... | ... |
| ... | ... | ... |

| TABL1 | | |
|---|---|---|
| FILM | SERVER | FAW |
| A1 | SL1 | $FAW_{A1}$ |
| B2 | SL1 | $FAW_{B2}$ |
| ... | ... | ... |

COMMUNICATION SYSTEM WITH HIERARCHICAL SERVER STRUCTURE

TECHNICAL FIELD

The present invention concerns a communication system with servers for storing services for user terminals and interconnected via exchanges.

BACKGROUND OF THE INVENTION

Such a communication system is known from the article "An Open Systems Approach to Video On Demand" by Y.-H. Chang et al, IEEE Communications Magazine, May 1994, pages 68 to 80. The communication system is a Video-On-Demand (VOD) communication system, in which the services are movies stored in the servers. The article states that three factors determine the optimum locations of the communication system servers and of the stored movies. They are: storage costs, transmission costs and the anticipated number of simultaneous users of each movie. To make Video-On-Demand attractive to the user, a suitable server structure must be found in the communication system, whereby the cost of the Video-On-Demand service, which is generated by hardware investments in the servers and transmission of the movie data via the public communications network, can be kept low. A hierarchical server structure is known from the article, which is predetermined by the rate of movie requests and the geographical distance of a server from the requesting user. The communication system is divided into several distance zones. Frequently requested movies are stored in servers that are close to the user (local), and less frequently requested movies are stored in central servers (regional, national servers, archives). The local servers are the subordinate servers and the central servers are the superordinate servers. If a user requests a movie, it is transmitted by the server close to the user (local server). If the local server cannot comply with the user's request, the local server requests a copy of the requested movie from the central server, which is stored in the local server via downloading. The local server has a reserve memory for storing the movie transmitted by the central server. The requested movie is transmitted at a high bit rate in a short period of time via the public communications network from the central server to the local server, where it is stored in the reserve memory. If the requesting rate for movies frequently requested by the users and stored in local servers becomes low, the movie is deleted from the local server and is then only available from the central servers.

DISCLOSURE OF INVENTION

It is the task of this invention to present a communication system with a hierarchical server structure, which makes possible a suitable, effective compliance with the requests for services from user terminals.

According to the present invention, a communication system comprising servers each having a memory for storing services and a control facility, exchanges connected to the servers and with one another, and user terminals connected to the exchanges, the servers being organized in the form of a hierarchical structure with subordinate servers and superordinate servers, is characterized in that if one of the subordinate servers is unable to provide a service requested by one of the user terminals, the respective superordinate server or one of the other subordinate servers is in a position to comply with the request from the user terminal via a switched connection between the requesting user terminal and the respective superordinate server or the other subordinate server.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
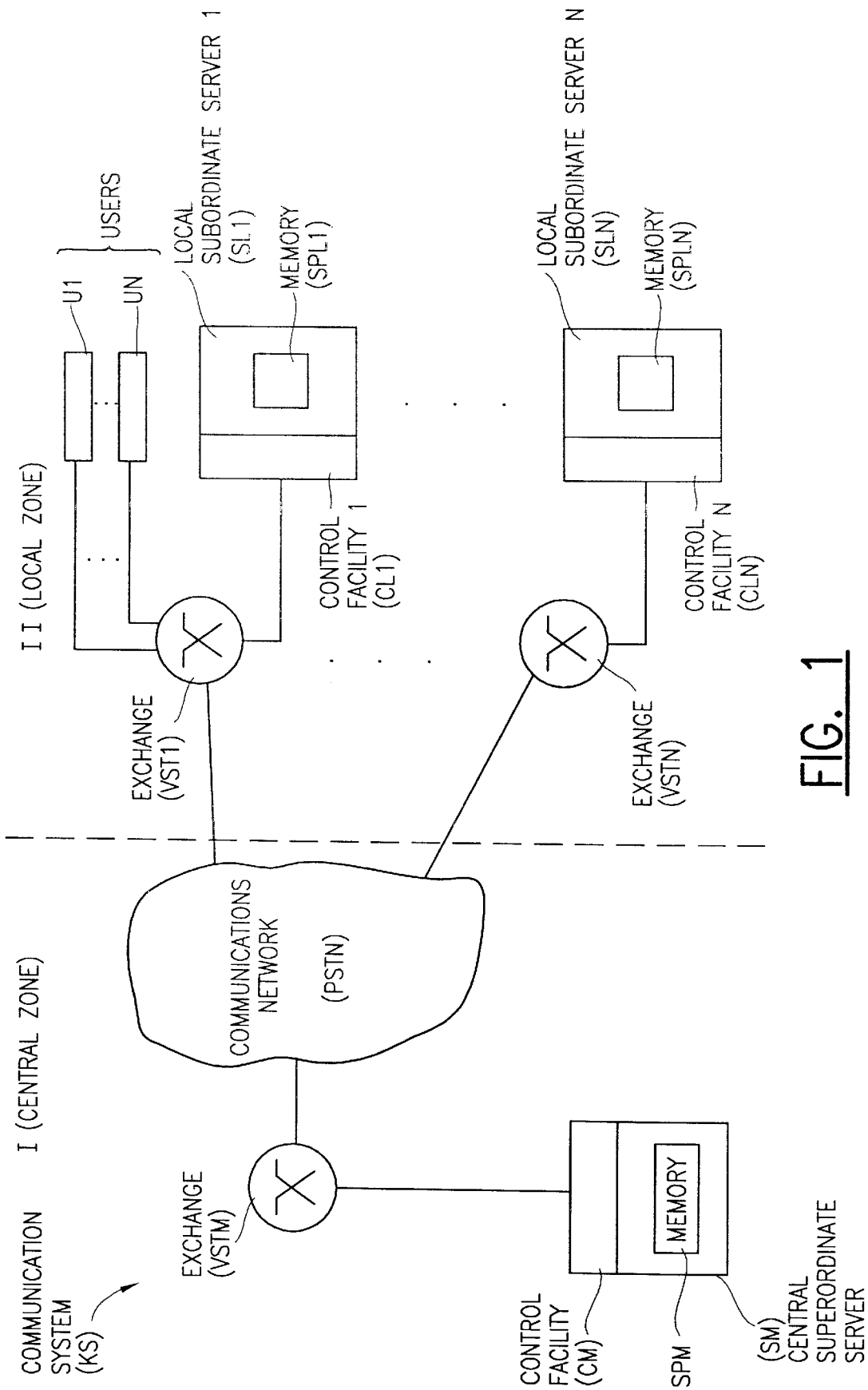
FIG. 1 is a configuration example of a communication system according to the invention.

FIG. 1 depicts the configuration example of a communication system KS according to the invention for a demand service which in the present configuration examples is a Video-On-Demand service. However, it could also be a request for audio, for electronically stored books, or for another service. The services stored in the configuration examples are therefore movies, which can be requested by users. The communication system KS is divided into two distance zones, a central zone I and a local zone II that is close to the user. These two distance zones I and II determine a hierarchical server structure of the communication system KS. It is also possible to establish the hierarchical server structure in accordance with other criteria. The central zone I includes an exchange VSTM, to which a central superordinate server SM is connected. The central server SM has a control facility CM and a memory SPM for storing movies. Users can be connected to the exchange VSTM however this is not significant for the description of the invention in the present configuration example. A number of other exchanges VST1 . . . VSTN (N is a natural number when N>1) are located in the local zone II, and a respective local, subordinate server SL1 . . . SLN is connected to each. Each local server SL1 . . . SLN contains a control facility CL1 . . . CLN and a memory SPL1 . . . SPLN for storing movies. A number of users are connected to the exchanges VST1 . . . VSTN of the local zone II, represented in the configuration example by users U1 . . . UN, who are connected to the exchange VST1. The exchanges VST1 . . . VSTN of the local zone II are connected to the exchange VSTM of the central zone I through a communications network PSTN for switched connections. This communications network PSTN switches connections between the users and the servers, as needed.

To simplify the description of the invention, the communication system KS in the present configuration example has been divided into two distance zones. However, the invention can also be used in a different communication system with more than two distance zones and any number of exchanges, which are interconnected in different ways by any number of transmission arrangements. Also, one of the exchanges can be connected to none or to any number of servers, each having a predetermined number of assigned users.

The communication system KS has the hierarchical server structure determined by the rate at which the movies are requested and the geographical distance of the servers from a requesting user. The movies frequently requested by the users assigned to one of the local servers SL1 . . . SLN are stored in the memories SPL1 . . . SPLN of the local servers SL1 . . . SLN. Therefore, the movies stored in the memories SPL1 . . . SPLN can always be different, depending on the rate at which the users assigned to the respective servers request them. In the following, the local servers SL1 . . . SLN and their assigned users are represented by the local server SL1 and by the users U1 . . . UN assigned to this server SL1. For that reason, the movies A1 . . . A10 most frequently requested by the users U1 . . . UN are stored in the memory SPL1 of the local server SL1. The movies B1 . . . B100, which are seldom requested by the users U1 . . . UN, and the frequently requested movies A1 . . . A10, which are stored in the memory SPL1 of the local server SL1, are stored in the memory SPM of the central server SM. In addition, the memory SPM also stores the movies frequently requested by the other users of the local zone 11, not considered here, and assigned to the servers SL2 . . . SLN, which are stored in the memories SPL2 . . . SPLN of the respective local servers SL2 . . . SLN, and do not correspond to the movies A1 . . . A10 stored in the memory SPL1. However, these movies do not figure in the present configuration example.

Figure 2:
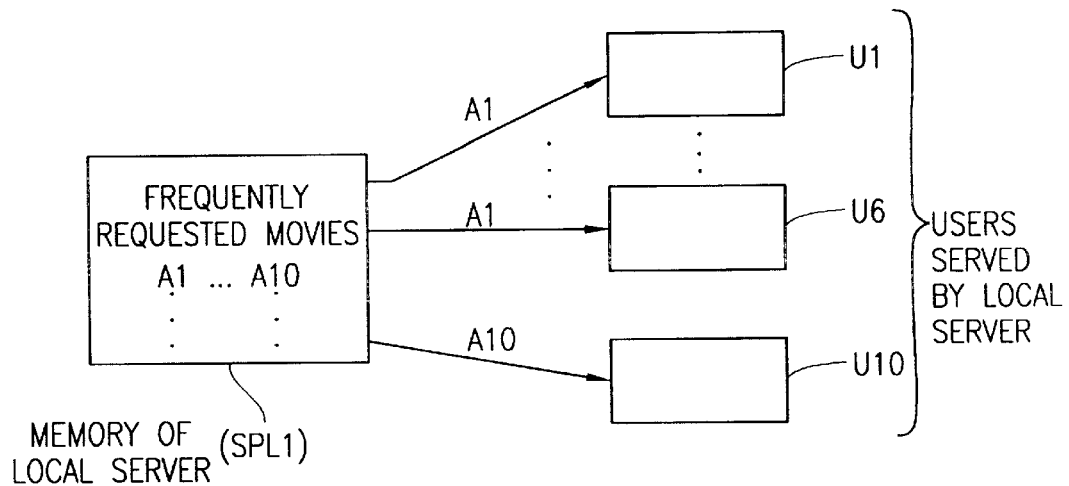
FIG. 2 is a first configuration example of a request for movies by users.

FIG. 2 depicts the first configuration example of a request for movies by the users U1 . . . U6, U10. The frequently requested movies A1 . . . A10 are stored in the memory SPL1 of the local server SL1. Several copies of a movie could be stored in the memory SPL1, in accordance with an assumed requesting rate for those movies by the users. In the first configuration example of FIG. 2, the movie A1 is being transmitted at the moment by the local server SL1. Thus, in the present configuration example all requests for movies are complied with by the local server SL1. Other requests for movies by the users are not illustrated for reasons of clarity, but they do exist.

Figure 3:
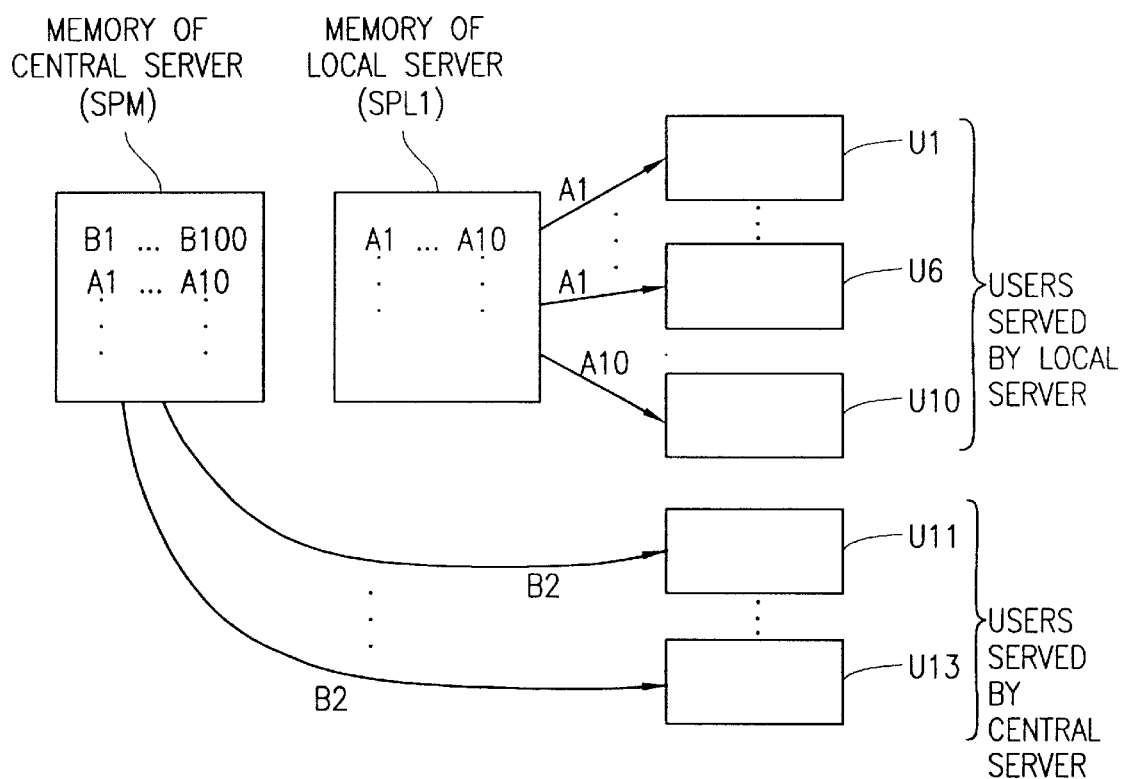
FIG. 3 is a second configuration example of a request for movies by users.

FIG. 3 depicts a second configuration example of a request for movies by the users U1 . . . U6, U10 . . . U13. In this second configuration example, not all the requests for movies from the users can be complied with by the local server SL1. As with the first configuration example in FIG. 2, in the second configuration example in FIG. 3 the local server SL1 transmits the movie A1 to the users U1 . . . U6, while the movie A10 is transmitted to user U10. In addition, the memory SPM of the central server SM transmits the movie B2 to the users U11 . . . U13. Since the local server SL1 was unable to provide the movie B2 to the users U11 . . . U13, the local server SL1 passed the requests for the movie B2 by the users U11 . . . U13 on to the central server SM, which complies with them. The local server SL1 is also unable to provide the movie if the number of copies of one of the frequently requested movies A1 . . . A10 is insufficient in the memory of the local server SL1 to comply with the requests for this movie by the users U1 . . . UN. In that case, the surplus of the requests for this movie is also passed on to the central server SM, which complies with them.

The local server SL1 has the control facility CL1, and the central server has the control facility CM, to control the requests for a movie by the users U1 . . . UN. When one of the users U1 . . . UN requests a movie, the exchange VST1 establishes a connection to the local server SL1. The control facility CL1 receives the commands from the respective user and causes the transmission of the requested movie from the memory SPL1 to the requesting user. If the local server SL1 is unable to provide the requested movie, the control facility CL1 passes the request from the respective user U1 . . . UN on to the central server SM. The control facility CM of the central server SM receives the commands from the local server SL1 and establishes a data and control connection to the respective requesting user U1 . . . UN. This releases the connection between the requesting user U1 . . . UN and the local server SL1. Subsequently, the control facility CM causes the transmission of the requested movie from the memory SPM to the respective requesting user U1 . . . UN.

However, when the local server SL1 is unable to provide the requested movie, it is also possible to pass the request for this movie on to one of the other neighboring local servers SL2 . . . SLN, so that the request can be complied with by this local server SL2 . . . SLN. To that end, the control facility CM of the central server SM checks whether one of the other local servers SL2 . . . SLN is able to comply with the request. The central server SM contains information about which movies and how many copies of these movies are stored in the respective local servers SL2 . . . SLN. If the control facility CM determines that one of the other local servers SL2 . . . SLN is able to comply with the request, it establishes a connection between the respective requesting user U1 . . . UN and the other local server SL2 . . . SLN, through which the other local server SL2 . . . SLN can comply with the request from the respective requesting user U1 . . . UN.

Figures 4, 6:
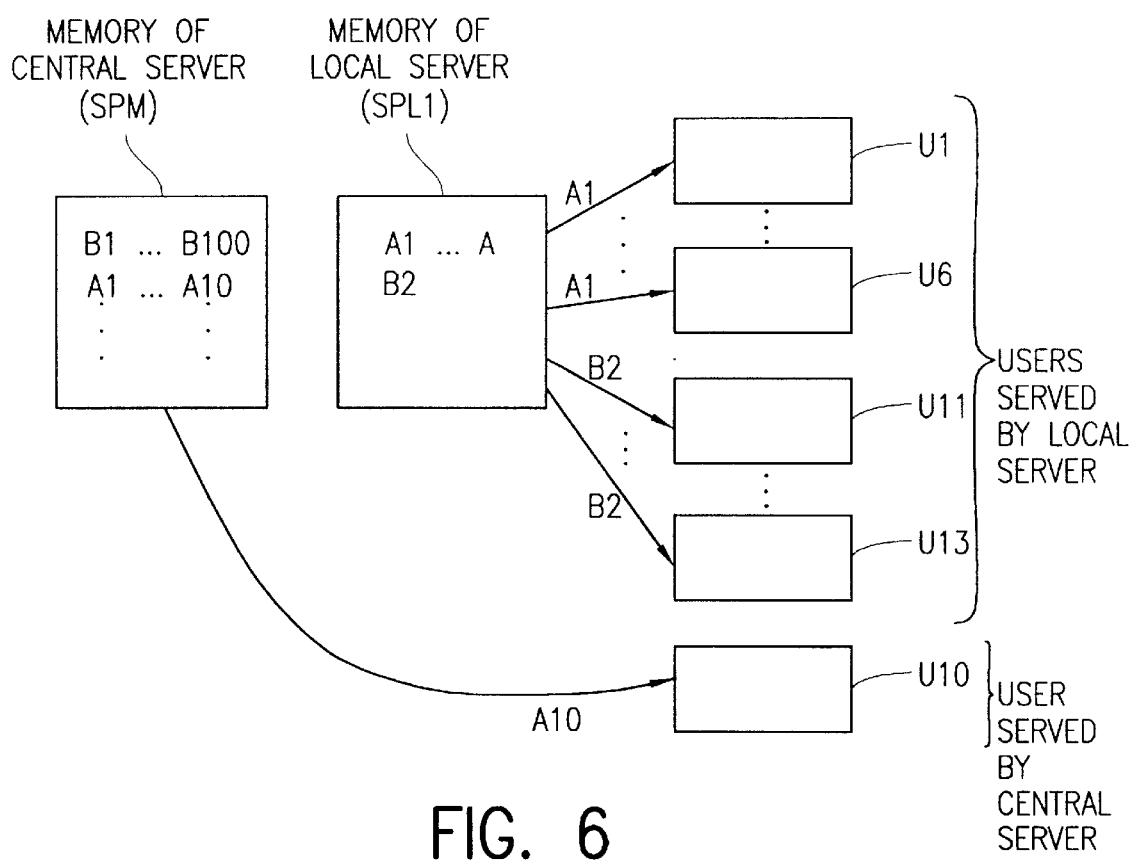
FIG. 4 is a first configuration example of a control table of a central and a local server according to the second configuration example in FIG. 3.
FIG. 6 is a third configuration example of a request for movies by users after a movie was copied from the central server to the local server.

The control facilities CL1 and CM provide a control table for the respective server SL1 and SM. FIG. 4 depicts the first configuration example of the control tables of the central server SM and the local server SL1 according to the second configuration example in FIG. 3. The control table TABL1 of the local server SL1 is produced by the control facility CL1 and, for each movie A1 . . . A10 stored in the server SPL1, contains a movie request value FAW and the identity of the server to which the users are assigned, who are requesting the respective movie at that moment. The control table TABM of the central server SM is produced by the control facility CM. For each movie stored in the server SPM, it also contains the movie request value FAW and the identity of the server to which the users are assigned, who are requesting the movie at that moment, thereby producing the movie request value FAW. The movie request value FAW provides a time integral for a function, which depends on the simultaneous requests for the respective movie, which are complied with at that moment by the respective server. In the case of the central server SM the movie request value FAW provides a time integral for a function that depends on the simultaneous requests for the respective movie, which are complied with at that moment by the central server SM, because the local server SL1 is unable to do so. Without simultaneously present requests, the function has a negative value, thereby reducing the movie request value FAW until it reaches the minimum value of zero. With one or more simultaneous requests, the function has a positive value, which depends on the number of simultaneous requests and possibly on other factors as well, such as e.g. storage costs, transmission costs, etc. In that case, it causes the movie request value FAW to increase; it is however limited upwards, i.e. a maximum movie request value $FAW_{max}$ is specified. In the present configuration examples, the time integral is determined from the time at which the respective movie is made available in the respective server SM, SL1 . . . SLN, to the present time, so that the movie request value FAW also includes the history of the requests for the respective movie.

Figure 5A:
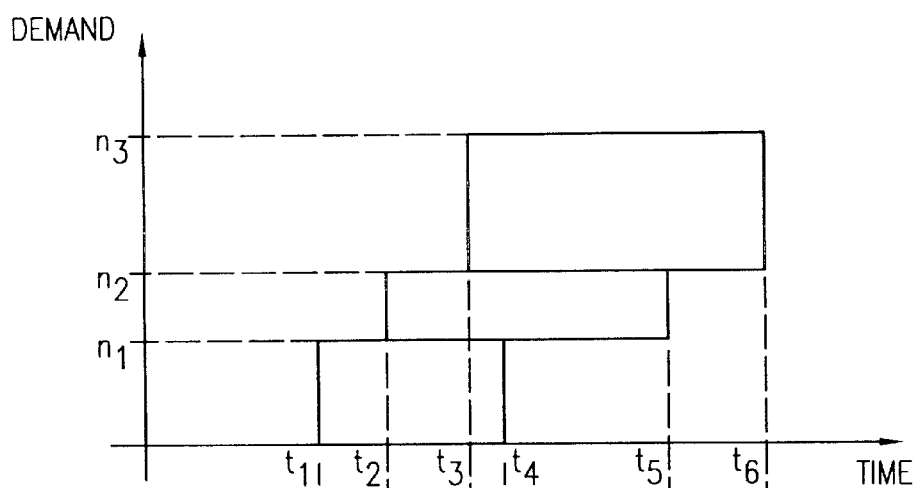
FIGS. 5A, B is a configuration example of the time process of a movie request value.

FIGS. 5 A and B depict a configuration example of the timely process of the movie request value FAW, as determined from the number of simultaneous requests. FIG. 5A depicts a coordinate system in which the number of requests for a movie is plotted with respect to time. At a point in time $t_1$, $n_1$ requests for the movie are present in the respective server SM, SL1 . . . SLN. At a point in time $t_2$, the number of requests increases to $n_2$, and at a point in time $t_3$, to $n_3$ requests. At a point in time $t_4$, the number of requests decreases to $n_3-n_1$, and at the point in time $t_5$ to $n_3-n_2$. At a point in time $t_6$, there are no more requests for the movie in the server.

Figure 5B:
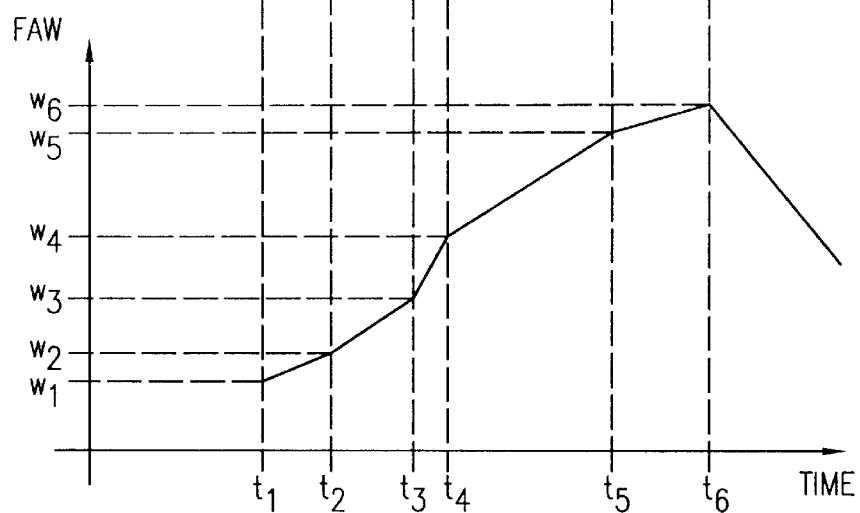

FIG. 5B depicts a coordinate system in which the movie request value FAW for the number of requests according to the configuration example in FIG. 5A is plotted with respect to time. The configuration example of FIGS. 5 A and B considers the frequency of requests for the movie in the time represented here, so that the FAW with a value of $w_1$ is not zero at the point in time $t_1$. The FAW now increases in substantially linear form to a value of $w_2>w_1$ at the point in time $t_2$. The positive gradient of the curve now increases, since more requests are present, and reaches a value of $w_3>w_2$ at the point in time $t_3$. The gradient of the curve increases subsequently again, until it reaches a value of $w_4>w_3$ at the point in time $t_4$. Since the number of requests is now decreasing, the positive gradient of the curve also decreases and reaches a value of $w_5>w_4$ at the point in time $t_5$. After that the number of requests decreases further, the gradient of the curve decreases as well and the FAW is $w_6>w_5$ at the point in time $t_6$. Since there are no further requests for the movie, the function of determining the FAW, whereby the time integral is formed, becomes negative. This means that the gradient of the FAW curve also becomes negative and the FAW decreases.

In the second configuration example of FIG. 3, the local server SL1 provides the movie A1 to the users U1 . . . U6. Therefore, a movie request value $FAW_{A1}$ for the movie A1 and the server SL1 is entered by the control facility CL1 into the control table TABL1 in FIG. 4, since the local server SL1 is transmitting the movie A1 to the users U1 . . . U6, who are assigned to this local server SL1. Accordingly, the control table TABL1 also contains the movie request value $FAW_{A10}$ for the movie A10 and the server SL1, since the local server SL1 is transmitting the movie A10 to user U10, who is assigned to this local server SL1. According to FIG. 4, the control table TABM of the central server SM contains the movie request value $FAW_{B2}$ for the movie B2 and the local server SL1 since, according to the second configuration example in FIG. 3, the central server SM is transmitting the movie B2 to the users U11 . . . U13, who are assigned to the local server SL1. For reasons of clarity, no further entries are listed in the control tables TABL1 and TABM.

The control facility CL1 of the local server SL1 causes the movie request values FAW to be transmitted to the central server SM. The control facility CM of the central server SM compares the movie request values FAW transmitted by the local server SL1, with the movie request values FAW in its control table TABM, for requests of movies which were complied with by the central server SM because the local server SL1 was unable to do so. In the configuration example of FIG. 4, the control facility CL1 of the local server SL1 causes the transmission of the movie request value $FAW_{A1}$ for the movie A1 and the server SL1, and the transmission of the movie request value $FAW_{A10}$ for the movie A10 and the server SL1, via a connection between the local server SL1 and the central server SM. The control facility CM of the central server SM receives the transmitted movie request values and compares them to the movie request value $FAW_{B2}$ in table TABM for the movie B2 and the server SL1. In the present configuration example, the control facility CM thereby determines that the movie request value $FAW_{B2}$ for the movie B2 and the server SL1 is greater than the movie request value $FAW_{A10}$ for the movie A10 and server SL1, transmitted by the local server SL1. This means that the integrated requesting rate for the movie B2 by users U11 . . . U13, who are assigned to the local server SL1, is greater than the integrated requesting rate for the movie A10 by user U10, who is also assigned to the local server SL1. However, since the movie B2 must be transmitted over a geographically longer distance from the central server SM to the respective users U11 . . . U13, instead of the short distance between the local server SL1 and the users, the control facility CM of the central server SM causes the movie B2 to be copied to the memory SPL1 of the local server SL1. In this way, the movie request value represents a criterion for a decision within the hierarchical server structure of the communication system KS, as to which movie and when that movie is copied from the central server SM to one of the local servers SL1 . . . SLN.

FIG. 6 depicts the third configuration example of a request for movies by the users U1 . . . U6, U10 . . . U13, after the movie B2 has been copied from the central server SM to the local servers SL1. The memory SPM of the central server SM now also contains movies B1 . . . B100 and A1 . . . A10. After the copying, the memory SPM of the local server SL1 contains movies A1 . . . A9 and B2. This means that the movie A10 was deleted from the memory SPL1 while the movie B2 was copied from the central server SM to the local servers SL1. However, it is also possible to leave the movie A10 in the memory SPL1, if the capacity of the memory SPL1 is large enough. In this third configuration example in FIG. 6, the local server SL1 now transmits the movie A1 to the users U1 . . . U6, and the movie B2 to the users U11 . . . U13. The movie A10 is now transmitted from the memory SPM to user U10, via a connection between user U10 and the central server SM.

Figures 7, 8:
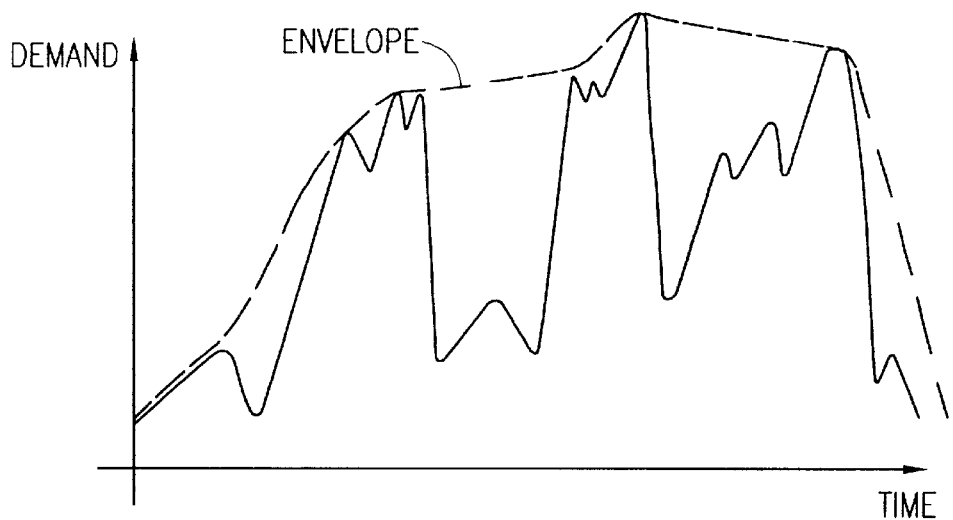
FIG. 7 is a second configuration example of a control table of the central and the local server according to the third configuration example in FIG. 6.
FIG. 8 is a configuration example of the time process of a requesting rate for a movie.

FIG. 7 depicts the second configuration example of the control tables of the central server SM and the local server SL1, after the movie B2 has been copied to the memory SPL1 in accordance with the third configuration example in FIG. 6. The control table TABL1 produced by the control facility CL1 now contains the movie request value $FAW_{A1}$ for the movie A1 and the server SL1, and the movie request value $FAW_{B2}$ for the movie B2 and the server SL1. The control table TABM produced by the control facility CM now contains the movie request value $FAW_{A10}$ for the movie A10 and the server SL1.

In the described configuration examples, the control facility CL1 of the local server SL1 causes the movie request values FAW to be transmitted to the central server SM. According to the invention, it is also possible for the control facility CL1 to determine the smallest movie request value FAW in the control table TABL1, and cause the smallest movie request value to be transmitted exclusively to the central server SM. In this way, fewer data are transmitted between the two servers SL1 and SM and the control facility CL1 needs to perform fewer comparison operations. Beyond that, it is also possible for the control facility CL1 to cause the transmission of the movie request values FAW from the local server SL1 to the central server SM at predetermined points in time, or for the control facility CM of the central server SM to request the transmission of the movie request values FAW.

The determination of the movie request values FAW through the control facility CM can be advantageously changed, so that the increase in the movie request value FAW depends on the geographical distance of the central server SM and the requesting user. In addition, the number of requests for movies, which are complied with by the central server SM, can be provided with an additional factor, an exponent, an e-function, etc., so that the corresponding movie request value FAW increases disproportionately with respect to the number of requests from these users, whose requests cannot be complied with by the local server SL1.

FIG. 8 depicts the configuration example of the process in time of the requesting rate of one of the movies. In a coordinate system, the time is plotted on the abscissa, and the number of requests for this movie is plotted on the ordinate. In addition to the actual course of the requesting rate, the enveloping curve is drawn by a broken line in FIG. 8. Usually several copies of a movie are stored in the memories for storing movies in the servers of the communication system KS, particularly in local servers. The number of copies is determined by the requesting rate of the movies. However, this number of copies should not be the actual time-dependent requesting rate, since this would lead to too many recopying procedures. Therefore, the enveloping curve of the actual time-dependent requesting rate can advantageously serve to determine the number of copies of the movie.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A communication system (KS) comprising:
   servers (SM, SL1, ..., SLN) each having a memory (SPM, SPL1, ..., SPLN) for storing services and a control facility (CM, CL1, ..., CLN);
   exchanges (VSTM, VST1, ..., VSTN) connected to the servers (SM, SL1, ..., SLN) and with one another; and
   user terminals (U1, ... UN) connected to the exchanges (VSTM, VST1, ..., VSTN),
the servers (SM, SL1, ..., SLN) being organized in the form of a hierarchical structure with subordinate servers (SL1, ..., SLN) and superordinate servers (SM), characterized in that if one of the subordinate servers (SL1, ..., SLN) signals to a respective superordinate server that the subordinate server is unable to provide a service requested by one of the user terminals (U1, ..., UN), the respective superordinate server (SM) determines whether said respective superordinate server or another one of the subordinate servers (SL1, ..., SLN) is in a position to comply with the request from the user terminal (U1, ..., UN) via a switched connection between the requesting user terminal (U1, ..., UN) and the respective superordinate server (SM) or said another one of the subordinate servers (SL1, ..., SLN).

2. A communication system as claimed in claim 1, characterized by being divided into one or more distance zones (I, II) as viewed from one of the user terminals (U1, ..., UN), and in that the subordinate servers (SL1, ..., SLN) are located in a distance zone (II) close to the user, while the superordinate servers (SM) are located in a central distance zone (I).

3. A communication system as claimed in claim 1, characterized in that the control facility (CM, CL1, ..., CLN) of each server (SM, SL1, ..., SLN) determines a service request value (FAW) for each service stored in the memory (SPM, SPL1, ..., SPLN), that the service request value (FAW) is an indication of a frequency of requests for the service from the user terminals (U1, ..., UN), and that the service request value (FAW) is a criterion for storing of one of the services in one of the subordinate servers (SL1, ..., SLN) or in a respective superordinate server (SM).

4. A communication system as claimed in claim 3, characterized in
   that a control facility (CL1, ..., CLN) of each subordinate server (SL1, ..., SLN) initiates a transfer of the service request values (FAW) to the superordinate server (SM),
   that a control facility (CM) of the superordinate server (SM) compares the transferred service request value (FAW) from each subordinate server (SL1, ..., SLN) with service request values (FAW) for requests for services (B2) which are handled by the superordinate server (SM) because of an inability of a respective subordinate server (SL1, ..., SLN) to provide said services, and
   that the control facility (CM) of the superordinate server (SM) causes a service (B2) to be copied into the memory (SPL1, ..., SPLN) for storing services of a respective subordinate server (SL1, ..., SLN) whose service request value (FAW) in the superordinate server (SM) is greater than a service request value (FAW) for one (A10) of the services of the respective subordinate server (SL1, ..., SLN).

5. A communication system as claimed in claim 3, characterized in that the service request value specifies a time integral of a function which has a negative value if no request is present for a particular service in a respective server (SM, SL1, ..., SLN), and which, if a number of requests for the particular service are present simultaneously, has a positive value which depends on the number of requests that are present simultaneously.

6. A communication system as claimed in claim 3, characterized in that the control facility (CM) of the respective superordinate server (SM) increases the service request value (FAW) disproportionately for the service (B2) for which the request from one of the user terminals (U1, ..., UN) is handled by the respective superordinate server (SM) because the respective subordinate server (SL1, ..., SLN) is unable to provide this service.

7. A communication system as claimed in claim 4, characterized in that the control facility (CL1, ..., CLN) of each subordinate server (SL1, ..., SLN) initiates the transfer of the service request values (FAW) to the superordinate server (SM) at predetermined time intervals.

8. A communication system as claimed in claim 1, characterized in that if the respective superordinate server determines that said another one of the superordinate servers is in a position to comply with the request, the respective superordinate server establishes a connection between said one of the user terminals and said another one of the superordinate servers.

9. A communication system as claimed in claim 8, characterized by being divided into one or more distance zones (I, II) as viewed from one of the user terminals (U1, ..., UN), and in that the subordinate servers (SL1, ..., SLN) are located in a distance zone (II) close to the user, while the superordinate servers (SM) are located in a central distance zone (I).

10. A communication system as claimed in claim 8, characterized in that the control facility (CM, CL1, ..., CLN) of each server (SM, SL1, ..., SLN) determines a service request value (FAW) for each service stored in the memory (SPM, SPL1, ..., SPLN), that the service request value (FAW) is an indication of a frequency of requests for the service from the user terminals (U1, ..., UN), and that the service request value (FAW) is a criterion for storing of one of the services in one of the subordinate servers (SL1, ..., SL1) or in a respective superordinate server (SM).

11. A communication system as claimed in claim 10, characterized in that a control facility (CL1, ..., CLN) of each subordinate server (SL1, ..., SLN) initiates a transfer of the service request values (FAW) to the superordinate server (SM), that a control facility (CM) of the superordinate server (SM) compares the transferred service request value (FAW) from each subordinate server (SL1, ..., SLN) with service request values (FAW) for requests for services (B2) which are handled by the superordinate server (SM) because of an inability of a respective subordinate server (SL1, ..., SLN) to provide said services, and that the control facility (CM) of the superordinate server (SM) causes a service (B2) to be copied into the memory (SPL1, ..., SPLN) for storing services of a respective subordinate server (SL1, ..., SLN) whose service request value (FAW) in the superordinate server (SM) is greater than a service request value (FAW) for one (A10) of the services of the respective subordinate server (SL1, ..., SLN).

12. A communication system as claimed in claim 10, characterized in that the service request value specifies a time integral of a function which has a negative value if no request is present for a particular service in a respective server (SM, SL1 ..., SLN), and which, if a number of requests for the particular service are present simultaneously, has a positive value which depends on the number of requests that are present simultaneously.

13. A communication system as claimed in claim 10, characterized in that the control facility (CM) of the respective superordinate server (SM) increases the service request value (FAW) disproportionately for the service (B2) for which the request from one of the user terminals (U1, ..., UN) is handled by the respective superordinate server (SM) because the respective subordinate server (SL1, ..., SLN) is unable to provide this service.

14. A communication system as claimed in claim 11, characterized in that the control facility (CL1, ..., CLN) of each subordinate server (SL1, ..., SLN) initiates the transfer of the service request values (FAW) to the superordinate server (SM) at predetermined time intervals.

* * * * *

UNITED STATES PATENT AND TRADEMARK OFFICE
CERTIFICATE OF CORRECTION

PATENT NO. : 5,898,456
DATED : April 27, 1999
INVENTOR(S) : Stefan Wahl

It is certified that error appears in the above-identified patent and that said Letters Patent is hereby corrected as shown below:

At column 7, line 44 (claim 1, line 7), after "(U1, ...)", insert --,--.

At column 9, line 10 (claim 10, line 10), "(SL1, ..., SL1)" should be --(SL1, ..., SLN)--.

At column 10, line 10 (claim 12, line 5), after "(SM, SL1", insert --,--.

Signed and Sealed this

Twenty-first Day of September, 1999

Attest:

Q. TODD DICKINSON

*Attesting Officer*   *Acting Commissioner of Patents and Trademarks*